UNITED STATES PATENT OFFICE.

GEORG KERESZTY AND EMIL WOLF, OF UJPEST, HUNGARY.

PROCESS FOR THE PRODUCTION OF SOLID BASIC MAGNESIUM HYPOCHLORITE.

1,400,167. Specification of Letters Patent. Patented Dec. 13, 1921.

No Drawing. Application filed April 8, 1920. Serial No. 372,331.

*To all whom it may concern:*

Be it known that we, Dr. GEORG KERESZTY and Dr. EMIL WOLF, citizens of Hungary, residing at Ujpest, in Hungary, have invented certain new and useful Improvements in a Process for the Production of Solid Basic Magnesium Hypochlorite, of which the following is a specification.

The solid basic magnesium hypochlorite has hitherto been produced by the treatment of hypochlorous acid, or of any alkali salt of this acid, with magnesia, because previous attempts, aiming at the production of the compound in question by the mere introduction of chlorin into magnesium oxid held in suspension, have been fruitless.

E. Merck assumes, in the description of the Hungarian Patent No. 72479 (3rd paragraph, page 2) corresponding to the German Patent No. 305419 and relating to the production of basic magnesium hypochlorites, that Lunge's experiments (see *Chemische Industrie*, vol. 8, pp. 340–341) had failed because the alkalinity of the magnesia was insufficient to bring about the reaction aimed at.

Our experiments have shown that the above assumption is erroneous. Merck seems, at times, to have used too much chlorin. By introducing chlorin into a liquid containing magnesia in suspension in a quantity such that for two molecules (four atoms) of the chlorin introduced four molecules of magnesium oxid are allotted the whole product of the reaction is soluble in water. Under these conditions therefore the solid basic magnesium hypochlorite sought by Merck is in reality not obtained.

If, however, the chlorin is introduced into the suspension of magnesium oxid in a quantity such that for two molecules (four atoms) of the chlorin introduced five molecules of magnesium oxid are present, solid basic magnesium hypochlorite is readily obtained which contains approximately 14% of the chlorin introduced in the form of "active" chlorin. The remaining quantity of chlorin is still present in the solution so that the precipitate contains only a very small portion of the chlorin.

We have found in our later experiments that chlorin can be better utilized by still further increasing the quantity of the magnesium oxid in proportion to the chlorin introduced even up to seven molecules and preferably up to seven and a half molecules of magnesium oxid to two molecules of chlorin, in which latter case about 75% of the introduced chlorin enters the precipitate as "active" chlorin.

In order to increase the yield, other measures which are contrary to the observations hitherto made are of importance. The yield, it should be noted, is influenced by the formation of chlorate which occurs simultaneously with the formation of the hypochlorite. In order to counteract the formation of chlorate Lunge proposed (*Chemische Industrie* vol. 8, p. 340–341) to introduce the chlorin at as low a temperature as possible, say at about 0° C. In contradistinction thereof it has been ascertained that while maintaining the proportion above referred to during the introduction of the chlorin, the temperature may be kept considerably above 0° C. or even above 15° C. and that there is no danger of any appreciable formation of chlorate. On the contrary there is the surprising fact that by introducing the chlorin into the mixture at a high temperature, say at about 20–22° C., the entry of this gas into the solid precipitate is materialy enhanced as will be seen from comparison of examples 2 and 3 given below.

It has already been mentioned that by maintaining a more favorable operation both as regards quantity of reacting materials and temperature of the mixture during the introduction of the chlorin only about 75% of the latter can be obtained in the precipitate as "active" chlorin.

We have, however, ascertained that in practice the whole "active" quantity of chlorin can be introduced into the precipitate if the reaction mixture produced after the introduction of the chlorin is allowed to stand for some time, say for example a week. After this time the supernatant liquid above the precipitate contains hardly any "active" chlorin, while the amount of chlorate formed in the precipitate during this time is quite immaterial if the reaction mixture has been allowed to stand in the dark.

It is very peculiar and surprising that the progress of this latter reaction, namely the transfer of the "active" chlorin from the solution into the precipitates, can be extremely accelerated by heating without risk of any noticeable formation of chlorate. It suffices, for instance, to heat the reaction mixture, after the introduction of the chlorin for 6 to 8 hours gradually to a temperature of 80° C. in order to transfer the whole "active" chlorin into the precipitate.

It may be mentioned that in all experiments the quantity of the chlorate produced has been ascertained to be so small, as to be in fact negligible provided the conditions above referred to are maintained.

With the aid of the novel process the initial substances are utilized with almost theoretical completeness and neither is it necessary to cool to low temperatures, nor to use electro-chemical contrivances. In the process magnesium hydroxid may be used instead of magnesium oxid with the same results; the expression "magnesium oxid" covers therefore not only the dry form of magnesium oxid, but the hydrated form $Mg(OH)_2$.

*Examples.*

1. 750 grs. of magnesium oxid were suspended in 10 liters of water kept at a temperature of 11—16° C. and 710 grs. of chlorin were introduced, during agitation for 17 hours. The stirring was continued after all the chlorin had been introduced until the smell of this gas had disappeared. The quantitative proportions corresponded to 2 molecules of magnesium oxid for 1 molecule of chlorin introduced in the suspension.

The introduction of the chlorin caused the magnesia to be almost entirely dissolved. The content of "active" chlorin in the filtrate was 4.38%, and the quantity of chlorate formed was small.

2. Into the suspension of 4,200 grs. of magnesium oxid in 20 liters of water at a temperature of 5—10° C. 2,000 grs. of chlorine were introduced with stirring for 17 hours, and the stirring was continued until the smell of chlorin had disappeared.

Volumetrically it was found that about 21% of "active" chlorin was present in the precipitate and about 79% in the solution. Solid basic magnesium hypochlorite therefore was formed but only in very small quantities. The chlorate was hardly formed at all.

3. This experiment was carried out with the same quantities as in example 2 with the difference however that the introduction of the chlorin took place at 20° C. The content of "active" chlorin in the total mass, that is to say, both in the solution and in the precipitate, amounted to 7.61%, and that in the filtrate to 2.2% so that 71% of the whole "active" chlorin gas passed into the precipitate as basic hypochlorite.

4. The reaction mixture obtained according to example 3, that is to say, the precipitate and solution after the introduction of the chlorin and the stirring of the mixture until the smell of chlorin had disappeared, wore gradually heated to 80° C. for 8 hours.

In 100 cc. of the filtrate only 0.23 gr. of "active" chlorin were found as hypochlorite and 0.24 gr. as hypochlorite and chlorate showing therefore only 0.01 gr. of "active" chlorin for chlorate. The precipitate, after drying gave on analysis 34.2% of "active" chlorin.

The solid basic magnesium hypochlorite obtained in the manner described above was then sucked away, thoroughly washed with hot water, and dried. The quality of the product depends on the drying which must be effected carefully with the exclusion of carbon dioxid.

If the washed product is washed with methyl alcohol, the losses in active chlorin during the drying process will be reduced and the drying accelerated.

What we claim is:—

1. A process for the production of solid basic magnesium hypochlorite by the action of chlorin on magnesium oxid in the presence of water, characterized by introducing chlorin into a mixture of water and magnesium oxid, containing more than two molecules of magnesium oxid for each molecule of the chlorin introduced.

2. A process for the production of solid basic magnesium hppochlorite by the action of chlorin on magnesium oxid in the presence of water, characterized by introducing chlorin into a mixture of water and magnesium oxid containing 3.5 to 4 molecules of magnesium oxid for each molecule of the chlorin introduced.

3. A process for the production of solid basic magnesium hypochlorite by the action of chlorin on magnesium oxid in the presence of water, characterized by introducing chlorin at a temperature above 15° C. into a mixture of water and magnesium oxid, containing more than 2 molecules of magnesuim oxid for each molecule of the chlorin introduced.

4. A process for the production of solid basic magnesium hypochlorite by the action of chlorin on magnesium oxid in the presence of water, characterized by introducing chlorin into a mixture of water and magnesium oxid, containing more than 2 molecules of magnesium oxid for each molecule of the chlorin introduced, the reaction mixture being allowed to stand for some time after the introduction of the chlorin, prior to the separation of the precipitate from the solution.

5. A process for the production of solid basic magnesium hypochlorite by the action of chlorin or magnesium oxid in the presence of water, characterized by introducing chlorin into a mixture of water and magnesium oxid, containing more than two molecules of magnesium oxid for each molecule of the chlorin introduced, the reaction mixture being heated for some hours after the introduction of the chlorin, prior to the separation of the precipitate from the solution.

6. A process for the production of solid basic magnesium hypochlorite by the action of chlorin on magnesium oxid in the presence of water, characterized by introducing chlorin into a mixture of water and magnesum oxid, containing 3.5 to 4 molecules of magnesium oxid for each molecule of the chlorin introduced, the reaction mixture being allowed to stand for some time after the introduction of the chlorin, prior to the separation of the precipitate from the solution.

7. A process for the production of solid basic magnesium hypochlorite by the action of chlorin on magnesium oxid in the presence of water, characterized by introducing chlorin into a mixture of water and magnesium oxid, containing 3.5 to 4 molecules of magnesium oxid for each molecule of the chlorin introduced, the reaction mixture being heated for some hours after the introduction of the chlorin, prior to the separation of the precipitate from the solution.

In testimony whereof we affix our signature in the presence of two witnesses.

Dr. GEORG KERESZTY.
Dr. EMIL WOLF.

Witnesses:
 EUGENE HARCANY,
 CHAS. MEDQYES.